Oct. 9, 1956

W. C. PIERCE 2,765,878

ELECTROMAGNETIC FRICTION DEVICE

Filed Nov. 12, 1952

INVENTOR
William C. Pierce
By Carlson, Pitzner, Hubbard & Wolfe
ATTORNEY

Oct. 9, 1956 W. C. PIERCE 2,765,878
ELECTROMAGNETIC FRICTION DEVICE
Filed Nov. 12, 1952 2 Sheets-Sheet 2
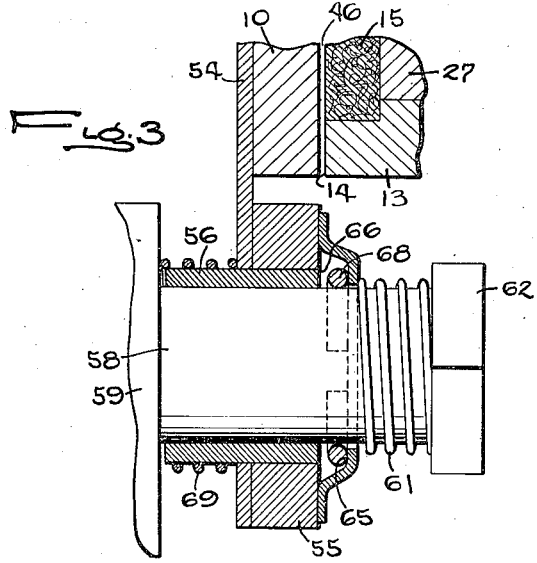
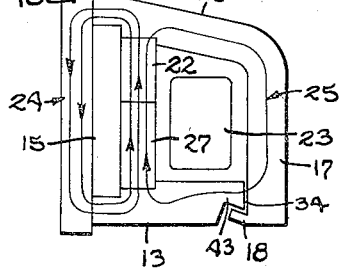
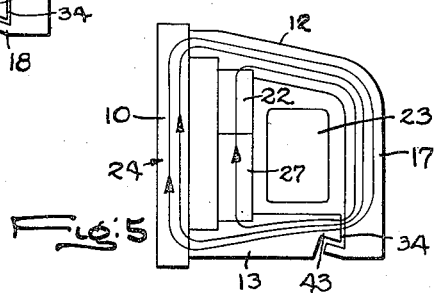
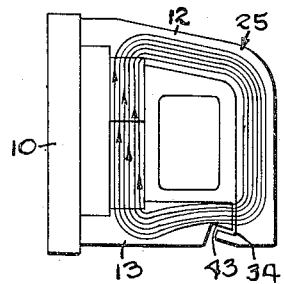
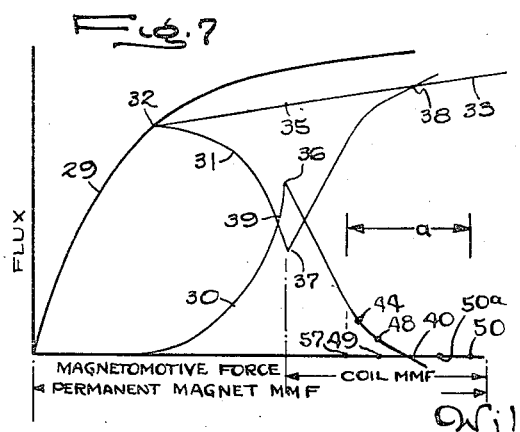
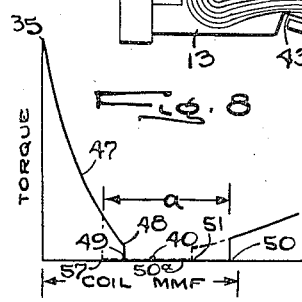
INVENTOR
William C. Pierce
By Carlson, Pitzner, Hubbard & Wolfe
ATTORNEY

United States Patent Office 2,765,878
Patented Oct. 9, 1956

2,765,878

ELECTROMAGNETIC FRICTION DEVICE

William C. Pierce, Beloit, Wis., assignor to Warner Electric Brake & Clutch Company, South Beloit, Ill., a corporation of Illinois Application November 12, 1952, Serial No. 319,879

9 Claims. (Cl. 188—164)

This invention relates to electromagnetic friction devices of the type in which an armature is drawn into engagement with the pole faces of a magnet by flux derived from a permanent magnet and is released upon energization of a coil arranged to produce a flux in the pole faces opposing that of the permanent magnet. More particularly, the invention has reference to a friction device incorporating a magnet comprising an annular core ring of U-shaped radial section having radially spaced concentric pole pieces spanned by a permanent magnet which is disposed between the end faces of the pole pieces and the closed end of the U and whose flux is divided between a main circuit through the pole faces and an auxiliary circuit of higher reluctance extending around the closed end of the U and by-passing the pole faces.

The primary object of the invention is to insure effective and full release of the armature in a friction device of the above character in spite of normal variations of the coil current in service use caused by changes in the temperature of the device or fluctuations of the voltage applied to the coil.

Another object is to achieve the foregoing object through a novel arrangement and construction of the by-pass part of the auxiliary flux circuit with respect to the coil and the main flux circuit through the pole faces.

A more detailed object is to locate the coil and construct the by-pass part of the auxiliary flux circuit in a novel manner such that substantially all of the coil flux threads the by-pass path and the latter becomes saturated when the coil and permanent magnet fluxes through the pole faces are opposed and substantially equal.

A further object is to maintain an extremely small air gap of constant width between the armature and the pole faces in their released positions through the provision of a novel wear compensating device which yieldably urges the armature and pole faces apart by a force less than the attractive force exerted by the permanent magnet.

Other objects and advantages of the invention will become apparent from the following detailed description taken in connection with the accompanying drawings, in which Figure 1 is a fragmentary sectional view of the improved electromagnetic friction device taken along the line 1—1 of Fig. 2.

Fig. 3 is an enlarged fragmentary sectional view similar to Fig. 1 and showing the parts in different positions.

Figs. 4, 5 and 6 are diagrammatic views illustrating the direction of the flux in the magnet under different conditions.

Fig. 7 is a chart showing a part of the hysteresis curve of the permanent magnet and changes in the flux in the main and auxiliary flux circuits under different conditions.

Fig. 8 is a chart showing the changes in torque produced by the device in response to changes in the magnetomotive force of the coil.

Figure 1:
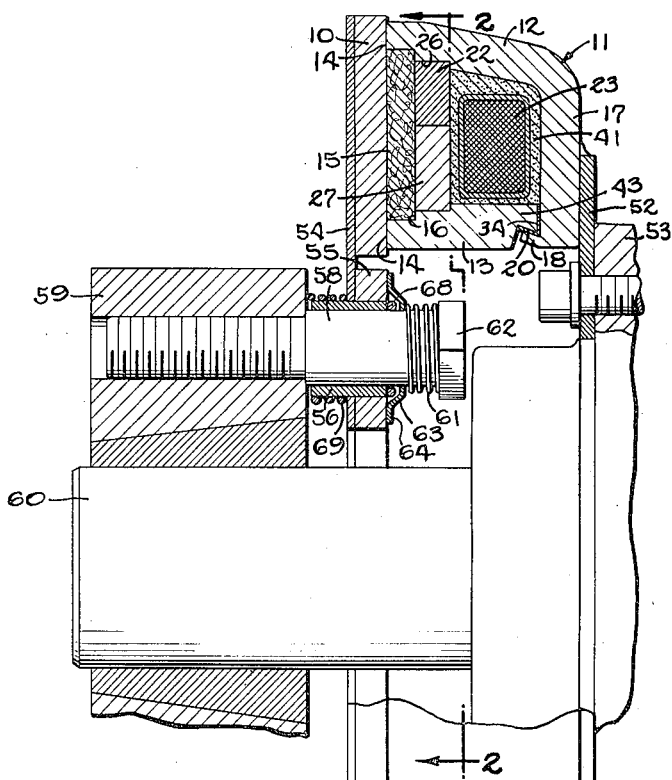
Figure 2:
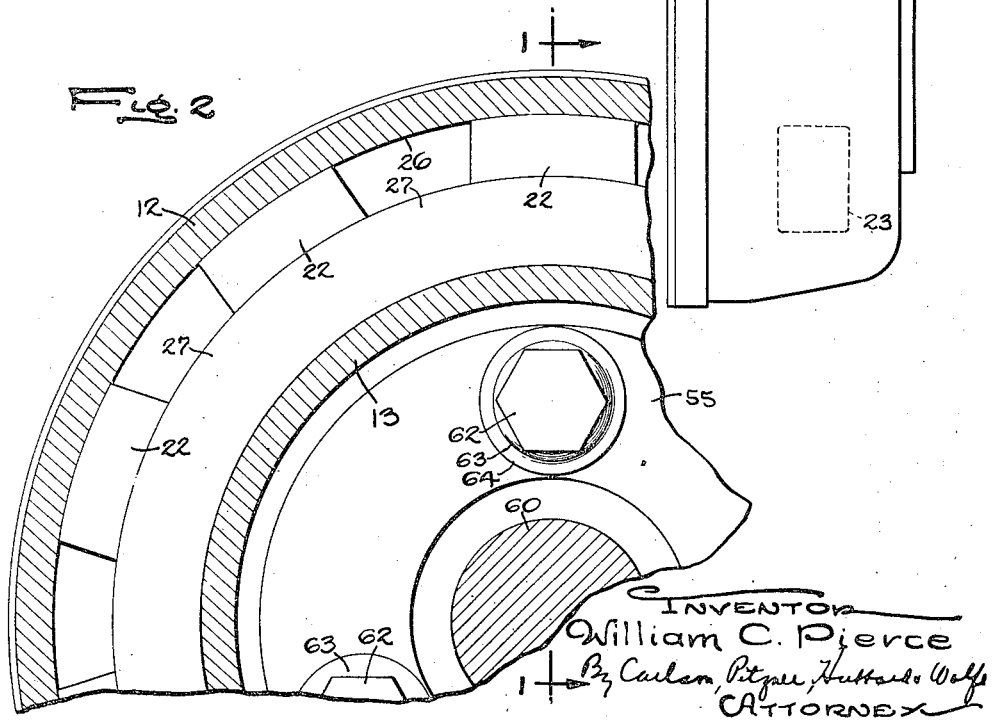
Fig. 2 is a fragmentary sectional view taken along the line 2—2 of Fig. 1.

While the invention is susceptible of various modifications and alternative constructions, I have shown in the drawings and will herein describe in detail only one embodiment of the invention. It is to be understood, however, that I do not intend to limit the invention by such disclosure but aim to cover all modifications and alternative constructions and uses falling within the spirit and scope of the invention as expressed in the appended claims.

In the drawings, the invention is shown for purposes of illustration embodied in an electromagnetic friction brake comprising generally a rotatably mounted armature 10 in the form of a flat magnetic iron ring and a magnet including a core ring 11 of magnetic material having two radially spaced pole pieces 12 and 13 concentric with the ring axis and terminating at one end in pole faces 14 which lie in a common plane. The pole faces are spanned by the armature ring and are flush with the outer surface of wear resistant material 15 in the form of segments seated against shoulders 16 on the pole pieces. Joining the other ends of the pole pieces to make the core ring 11 of U-shaped cross section is an end ring 17 which is preferably made integral at its outer edge with the outer pole piece 12. Herein, the inner pole piece 13 is formed as a separate part fastened rigidly in abutment with the inner edge of the end ring 17 by a thin flange 18 clenched around an undercut surface 20 on the pole piece.

Magnetic flux for drawing the working faces of the core ring 11 and the armature 10 into gripping engagement is derived from a permanent magnet 22. To release the brake, a winding 23 disposed within the core ring is energized to produce a magnetic potential between the pole faces opposing that of the permanent magnet. The permanent magnet is arranged within the core ring 11 to cooperate with the latter to form two parallel flux paths 24 and 25 (see Fig. 4) both extending through the permanent magnet. The main one of these paths extends from the permanent magnet and through the pole faces and the secondary or auxiliary path 25 extends around the closed end 17 of the U to by-pass the pole faces.

In this instance, the permanent magnet 22 comprises a series of radially disposed flat bars closely spaced circumferentially around the core and each having an outer arcuate end machined to fit closely against an inner surface 26 machined on the outer pole piece 12. At its inner end, each bar is curved to fit closely against the outer periphery of a flat ring 27 of magnetic material which constitutes a part of the core and which, along with the bars, defines a magnetic path spanning the pole pieces and forming a common part of the main and auxiliary flux circuits 24 and 25. At its inner periphery, the ring 27 is machined to fit in close abutment with a machined inner surface on the inner pole piece 13. A suitable permanent magnetic material such as aluminum-nickel-cobalt alloy is used to form the magnet bars 22 while the parts of the core 11 including the ring 27 are composed of a low reluctance material such as annealed ingot iron.

The action of the improved friction device is illustrated in Fig. 7 in which flux is plotted against magnetomotive force. A curve 29 represents a part of the hysteresis curve of the permanent magnet 22 while curves 30 and 31 show the relative values of flux in the main and auxiliary circuits 24 and 25 respectively for different values of the magnetomotive force of the permanent magnet and that of the coil which is directly proportional to current flowing in the coil. To magnetize the unit, a large magnetomotive force is applied externally and across the pole faces 14. When this force is removed, the magnetization of the permanent magnet will decrease along the curve 29 to a point 32 which represents the point of maximum output of the magnet as determined by the magnetizing force, the predetermined permanent magnet dimensions, and the flux circuit reluctances. At this point with the armature removed from the device, substantially all of the permanent magnet flux threads the auxiliary circuit and none threads the pole faces due to the large air gap between the latter.

Now, if the reluctance of the main flux circuit 24 is decreased by moving the armature 10 toward the pole faces 14, the permanent magnet characteristic will change along a minor hysteresis curve 33 to the operating point 35 for the unit where the armature is in full contact with the pole faces. At the operating point 35, the permanent magnet flux threads the main and auxiliary circuits 24 and 25 as shown in Fig. 4 in amounts indicated at 36 and 37 in Fig. 7 inversely proportional to the reluctances of the circuits. Because only the main circuit flux is useful for producing torque, a major portion of the permanent magnet flux is directed through the main circuit by interposing a magnetic restriction 34 in the auxiliary circuit resulting in a higher reluctance for the auxiliary circuit than that of the main circuit. In this instance, the main circuit reluctance is equal approximately to one-fourth of the auxiliary circuit reluctance so that the main circuit flux is approximately four-fifths of the total permanent magnet flux at the operating point. The magnetic restriction 34 comprises an air gap approximately .008 of an inch thick which is disposed between the opposed surfaces of the end ring 17 and the inner pole piece 13 and is filled by a thin layer of nonmagnetic material such as brass.

During the movement of the armature 10 toward the pole faces 14, the flux in the main circuit 24 increases along the curve 30 as the reluctance of the circuit decreases and the flux in the auxiliary circuit 25 decreases along its curve 31. Due to the fact that the main circuit flux increased from zero to a value 36 higher than the value 37 of the auxiliary circuit flux, the curves 30 and 31 cross each other at a point 39 where the fluxes and the reluctances of the two circuits are equal.

When the coil 23 is energized, the magnetomotive force applied thereby increases the by-pass flux to the value indicated at 38 while decreasing the main flux along the curve 30 to zero at a point 40. This condition is illustrated in Fig. 6 from which it will be apparent that the coil flux in the main circuit 24 is equal and opposite to the permanent magnet flux so as to balance the latter and produce a zero resultant flux in the main circuit.

To insure effective release of the armature 10 in response to energization of the coil 23, the present invention in one of its aspects contemplates a novel relation between the coil 23 and the by-pass circuit 25 in the arrangement of the two and the construction of the part of the core ring 11 defining the by-pass so as to reduce the sensitivity of the unit to fluctuations of current in the coil 23. For this purpose, the coil is located to enclose a part of the by-pass circuit so that substantially all of the flux produced by energization of the coil threads the by-pass. Also, the magnetic characteristics of the part of the core defining the by-pass are correlated with the remainder of the magnetic network defined by the core, the permanent magnet 22, and the armature 10 to produce saturation in at least a portion of the by-pass when the resultant flux in the main circuit is substantially equal to zero as shown in Fig. 6 and indicated at 40 in Fig. 7. At this time, the magnetomotive force across the pole faces 14 due to energization of the coil is opposite and substantially equal to the magnetomotive force across the pole faces due to the permanent magnet and the amount of flux, indicated at 38 in Fig. 7, flowing in the by-pass at this time is equal approximately to the sum of the permanent magnet flux in the by-pass circuit and the total flux produced by energization of the coil.

In the preferred form of the invention shown in the drawings, the coil 23 is a multiturn annular winding of approximately 1350 turns disposed within the core structure 11 between the closed end 17 of the U and the permanent magnet 22 and locked rigidly within the core as by a hardened nonmagnetic material 41 filling the spaces within the core and forming a backing for the permanent magnet and its associated ring 27. With this location of the coil, the part of the by-pass enclosed by the coil is that portion of the inner pole piece 13 located between the end ring 17 and the inner periphery of the magnetic ring 27 of the core structure.

Substantially all of the flux produced by energization of the coil threads the by-pass part of the circuit 25 and from there divides as shown in Fig. 5 between the permanent magnet and the pole faces, that part of the coil flux in the pole faces acting in the direction shown by the arrows in opposition to the permanent magnet flux therein, and the part threading the permanent magnet acting in the same direction as the permanent magnet flux.

At the point 40 of zero main circuit flux, the flux threading the by-pass circuit is equal to that threading the permanent magnet and is of a value indicated at 38 in Fig. 7 higher than the value 35 of permanent magnet flux at the operating point because the coil flux in the permanent magnet causes the total flux in the latter to increase from the operating point along its minor hysteresis curve 33. It is this higher value of flux at which the by-pass circuit is designed to become saturated.

The desired saturation of the by-pass part of the auxiliary circuit 25 is achieved in this instance by reducing the size of a section 43 of the circuit located adjacent the undercut surface 20 on the inner pole piece 13 to a cross sectional area such that, at a value of flux equal to the value 38 in the permanent magnet at the release point, the flux density of the section approaches the saturation point for the material from which the section is made. Herein, the saturable section 43 which is formed of annealed ingot iron becomes saturated at a flux density of around 125,000 lines per square inch.

With the novel construction of the by-pass and the location of the coil 23 relative thereto, an increase in current in the coil from zero results in a decrease of the amount of flux in the main circuit 24 first rapidly from the operating value 36 (see Fig. 7) along the curve 30 in proportion to the current increase until it reaches a value indicated at 44. Then, the curve 30 begins to flatten so that an increase of coil current in a given amount results in a smaller decrease in main circuit flux than occurred for the same amount of current increase around the operating point 35. Such flattening of the main circuit flux curve 30 occurs when the by-pass flux reaches the value where the section 43 begins to become saturated. The effect of saturation of the section 43 is to increase the reluctance of the by-pass circuit through which substantially all of the flux produced by the coil must pass due to the location of the coil with respect to the section. After such saturation, any increase in coil current results in an increase of reluctance of the by-pass circuit and a decrease of flux produced for a given amount of coil current change.

A continued increase of the coil current beyond the point where the main circuit flux curve 30 beings to flatten causes the main circuit flux to pass through the zero point 40. At the latter, the curve 30 is very flat so that any change in coil current results in a very small change in the attractive force between the armature 10 and the pole faces 14. This is advantageous because fluctuations of coil current due to temperature and voltage changes have only a small effect on the amount of torque transmitted by the device.

In a friction device of the type shown in the drawings where the overall diameter is approximately 10 inches, a desired torque of about 1500 inch-pounds is produced when the value 36 of the main circuit flux at the operating point is equal to about 380,000 lines, the value 37 of the by-pass flux at this point being approximately 100,000 lines so that the total permanent magnet flux is equal to 480,000 lines at the point 35 on its minor hysteresis curve 33. At the release point 38, by-pass flux which is the same as that in the permanent magnet is equal to approximately 500,000 lines. Because this is the value of flux at which the section 43 becomes saturated, the section for this purpose has a cross sectional area of approximately 4.0 square inches so that its flux density with this flux value is approximately 125,000 lines per square inch, that is, the saturation point for the section. Dimensions of the permanent magnet 22 found suitable to produce the desired magnetomotive force are a radial length of 9/16 of an inch and a total cross sectional area of 7.5 square inches.

To provide a further improvement in the release characteristics of a device of the above character, the invention in another of its aspects contemplates a novel mounting of the core ring 11 and the armature 10 by which the torque transmitted by the device is reduced to zero for a wide range of coil current fluctuations about the point 40 of zero main circuit flux. This is accomplished by yieldably urging the core and the armature apart to released positions by a predetermined force substantially less than the maximum attractive force exerted by the permanent magnet 22 and maintaining the two spaced apart in their released positions as shown in Fig. 3 by an air gap 46 of predetermined constant axial length regardless of wear on the friction faces of the device. The attractive force of the permanent magnet is correlated with the force urging the core structure and armature apart and with the air gap between the two in their released positions so that the brake is released as the main circuit flux approaches its zero point 40 and the permanent magnet may overcome the reluctance of the air gap 46 and the yieldable force to apply the brake when the coil is deenergized.

When the core ring 11 and the armature 10 are mounted in the novel manner described above, the operating characteristic of the device is as shown in Fig. 8 in which a curve 47 represents the torque transmitted for different values of coil magnetomotive force which are proportional to the energizing current in the coil 23. The torque transmitted is at a maximum at the operating point 35 with the coil deenergized but decreases rapidly along the curve 47 in response to an increase in coil current until it reaches a point 48 from which it drops to zero at a point 49. At the latter point, the coil current is less than its value at the point 40 of zero main circuit flux, but the armature and core are moved axially away from each other because the attractive force of the main circuit flux is slightly less than the yieldable force urging the core and armature apart. Corresponding points on the curves of Figs. 7 and 8 are indicated by the same reference numbers.

Whenever the coil current increases beyond the point 49 and through the point 40 at which the current is at its normal operating value, the torque transmitted remains at zero until the coil magnetomotive force reaches a value indicated at 50 where the flux produced at the pole faces is great enough to overcome both the yieldable force and the air gap 46 in addition to the flux of the permanent magnet 22 and draw the armature into engagement with the pole faces. The value of coil magnetomotive force at the point 50 is an abnormal one and is substantially higher than the normal operating value of coil magnetomotive force at the point 40 of zero main circuit flux and also substantially higher than the maximum rated magnetomotive force of the coil indicated at 50$^a$.

When the coil is deenergized after such overexcitation, the torque follows a curve indicated by the dotted line in Fig. 8 and decreases to zero at a point 51 where the armature is released and moves away from the pole faces. The torque then remains at zero until the magnetomotive force of the coil decreases past its value at the point 49 to a value indicated at 57. At the latter value of coil magnetomotive force, the main circuit flux is sufficient to overcome both the yieldable force and the reluctance of the air gap 46 and draw the armature back into engagement with the pole faces. This value of main circuit flux is greater than its value at the point 48 because it must overcome the air gap 46 in addition to the force urging the armature and the core apart. It will be apparent that a very stable operation is achieved because, after the armature is released, the coil magnetomotive force may fluctuate through a wide range indicated at $a$ between the points 50 and 57 and about the point 40 without pulling the armature back in and thereby changing the torque from its zero value.

In the present instance, the core ring 11 is stationarily mounted as by welding the end ring 17 to a plate 52 bolted to a fixed support 53 and the armature ring 10 is secured to a disk 54 mounted for rotation and axial movement toward and away from the core. The disk 54 is welded to a collar 55 which is apertured at annularly spaced points to receive bearing bushings 56 rigid with the collar and parallel to the axis of the core. To support the armature for free axial sliding movement, shouldered pins 58 project through the bushings 56 and thread into a support 59 which is axially fixed relative to the core and rotates with a shaft 60 or other part to which the retarding torque is to be applied.

The yieldable force for moving the armature 10 is produced by a plurality of compression springs 61 one being coiled about the inwardly projecting ends of each of the pins 58 and bearing at one end against the head 62 on the pin and at its other end against the outer surface of a dished washer 63 encircling the pin with its outer offset edge 64 bearing against the collar 55. At its other side, each washer provides an abutment 65 (Fig. 3) which, when the washer abuts the collar 55, is spaced axially away from the latter and an oppositely facing abutment 66 formed by the inner end of the bushing 56.

Movement of the armature 10 away from the core structure is limited by stops in the form of split rings 68 of resilient material engaged by the abutments 65 and encircling major portions of the pins 58 to grip the latter by a frictional force greater than that exerted by the springs but less than the attractive force exerted by the permanent magnet. The rings are disposed between the abutments 65 and 66 which are spaced apart a distance equal to the axial thickness of each ring plus the desired width of the gap 46 which herein is approximately 1/32 of an inch. To hold the armature 10 against drifting away from the stop 68 when the brake is idle, a compression spring 69 lighter than the spring 61 is coiled about the bushing 56 to bear at one end against the armature support 59 and at the other end against the disk 54. Each of the springs 69 is adapted to exert a force of about 1/2 pound as compared to the 2 to 4 pounds force of each spring 61, the resultant of the two forces being the yieldable force which the permanent magnet must overcome in addition to the reluctance of the air gap 46 to apply the brake.

When the coil 23 is deenergized, the armature will be drawn into engagement with the pole faces 14 and the bushings 56 will be moved thereby into engagement with the stops 68. As the friction faces of the armature and core structure become worn, the stops will be moved along the pins by the bushings to compensate for such wear so that, when the armature is released, the abutments engage the pins in their adjusted positions and the length of the air gap and therefore its reluctance remain constant. This insures that the permanent magnet will be able to overcome the air gap and the springs and draw the armature into contact with the pole faces 14 in spite of wear on the friction surfaces of the device.

It will be apparent that the magnetic friction device described above will be very stable in operation. This is because the novel construction and arrangement of the saturable section 43 and the coil 23 with respect to each other permits of wide fluctuations of coil current about the point 40 of zero main circuit flux while producing almost negligible changes in the attractive force between the pole faces 14 and the armature 10. In addition, a further improvement in the operating characteristic of the device is achieved by the automatic wear compensating means including the stops 68 and the springs 61 and 69 which not only insure release of the brake at the same point on the curve 30 of the main circuit flux each time that the coil 23 is energized, but also increase the permissible range of coil current fluctuations.

I claim as my invention:

1. The combination of, a magnetic core member providing an annular axially facing working face, an annular armature member coacting with said face, a permanent magnet having end poles of opposite polarity, said magnet and said members cooperating to form two parallel flux paths each extending through said magnet and the poles thereof with one path extending through and the other path by-passing said armature member, a coil enclosing a part of said by-pass path and adapted when energized to produce a flux opposing the permanent magnet flux through said armature member, said core member including a magnetic section forming a part of said by-pass path and saturable when the coil and permanent magnet fluxes in said armature member are substantially equal and opposite, means supporting one of said members for movement axially toward and away from the other member, spring means acting between said members to urge the two apart, and means engageable with said movable member to limit its axial separating movement under the action of said spring means and maintain a constant air gap between the members when the attractive force between the members is less than the force of said spring means.

2. The combination of, a magnetic core member providing an annular axially facing working face, an annular armature member having a working face coacting with said core face, a permanent magnet having end poles of opposite polarity, said magnet and said members cooperating to form two parallel flux paths each extending through said magnet and the poles thereof with one path extending through and the other path by-passing said armature member, a coil enclosing a part of said by-pass path and adapted when energized to produce a flux opposing the permanent magnet flux through said armature member, said core member including a magnetic section forming a part of said by-pass path and having magnetic characteristics correlated with the magnetic characteristics of said permanent magnet and said armature path to become saturated when said coil flux and the permanent magnet flux through said armature member are substantially equal and opposite, means supporting said members for relative movement axially toward and away from each other and yieldably urging the members apart, and means engageable with one of said members for limiting the axial separating movement thereof under the action of said urging means and operable to compensate for wear on said working faces and maintain the members spaced apart in released position by a gap small enough for said permanent magnet to overcome.

3. In a magnetic torque producing device, the combination of, a magnetic core member providing an annular axially facing working face, an armature member having an axially facing working face coacting with said core face, means supporting said members for relative axial movement toward and away from each other and yieldably urging the members apart, means engageable with one of said members for limiting the axial separating movement thereof under the action of said urging means and operable to compensate for wear on said working faces and maintain a gap of constant axial length between said faces in the released position of the members, a permanent magnet cooperating with said core member to define a flux circuit through the magnet and said faces across said gap and a second circuit by-passing said faces, said magnet having sufficient magnetization to overcome said gap and said urging means and draw said members into axial gripping engagement, and a coil enclosing a part of said flux circuits and operable when energized to produce a flux in said first flux circuit through said faces substantially equal and opposite to the permanent magnet flux in the first circuit to reduce the attractive force between the members substantially to zero.

4. In a magnetic torque producing device, the combination of, a magnetic core member providing an annular axially facing working face, an armature member having an axially facing working face coacting with said core face, means supporting said members for relative axial movement toward and away from each other and yieldably urging the members apart, means engageable with one of said members for limiting the axial separating movement thereof under the action of said urging means and operable to compensate for wear on said working faces and maintain a gap of constant axial length between said faces in the released position of the members, and a permanent magnet coacting with said core member to define a flux circuit through said gap and said faces and having sufficient magnetization to overcome said gap and said urging means and draw said members into axial gripping engagement.

5. A magnet comprising, a hollow annular shell of magnetic material of U-shaped cross section with the legs of the U terminating in annular pole faces, an annular multiple turn coil disposed within said shell adjacent the closed end of the U, and means spanning said legs between said pole faces and said coil and including a permanent magnet arranged to produce a flux opposing flux through said faces produced by energization of said coil, the portion of said shell enclosing said coil having magnetic characteristics correlated with the magnetic characteristics of said magnet means and the flux circuit extending from the ends of the latter through said pole faces to become substantially saturated by a flux equal approximately to the flux in the shell portion when the coil and permanent magnet fluxes through said faces are opposed and substantially equal.

6. The combination of, a magnetic core structure providing a pole piece terminating in a working face, an armature having a working face coacting with said core face, a permanent magnet cooperating with said core structure to form a flux path through the magnet and said armature and a second path including the magnet and by-passing the armature, and a coil enclosing a part of said by-pass path and operable when energized to produce in said armature path a flux substantially equal and opposite to the permanent flux in said path and a flux in said by-pass path in the same direction as the permanent flux in the by-pass path, said core including a section of magnetic material in said by-pass path having a predetermined cross-sectional area correlated with its permeability to become substantially saturated at a value of flux equal approximately to the sum of the coil flux and permanent magnet flux in the by-pass path at the time when the coil and permanent magnet fluxes in said armature circuit are opposite and substantially equal.

7. The combination of, an armature and a core structure of magnetic material, a permanent magnet having end poles of opposite polarity, said core structure, said armature, and said magnet cooperating to define two parallel flux paths each extending through said magnet and the poles thereof with one path extending through said armature and the other path by-passing the armature, and a winding enclosing a part of said by-pass path and adapted when energized to produce a flux opposing the permanent magnet flux in said armature path and a flux in said by-pass path in the same direction as the permanent flux therein, said by-pass path having magnetic characteristics correlated with the magnetic characteristics of said permanent magnet and said armature path to become substantially saturated with the coil flux and the permanent magnet flux in the by-pass path at the time when said coil flux and the permanent magnet flux through said armature path are substantially equal and opposite.

8. The combination of, an armature and a core structure of magnetic material having opposed coacting working faces, a permanent magnet cooperating with said core structure to define a flux circuit extending through the magnet and said armature and a parallel flux circuit extending through the magnet and by-passing the armature, and a coil enclosing a part of said parallel circuit and adapted when energized to cause flux to thread said permanent magnet in the same direction as the permanent magnet flux and said armature circuit in a direction opposite to the permanent magnet flux, said core structure including in said parallel circuit a section of magnetic material which is saturable at a value of flux equal approximately to the value of permanent magnet and coil flux in the parallel circuit at the time that the coil flux and the permanent magnet flux in said armature circuit become substantially balanced to reduce the attractive force between said armature and said pole faces substantially to zero.

9. The combination of, a hollow annular shell of magnetic material of U-shaped cross section having radially spaced legs terminating in pole faces, an armature spanning said pole faces, means including a permanent magnet spanning said legs within said shell and intermediate the leg ends and forming a common part of a first flux path extending through said armature and said pole faces and a second flux path extending around said shell and by-passing the pole faces, and a multiple turn winding disposed within said ring between said magnet means and the closed end of said U to encircle a part of said second flux path and operable when energized to produce a flux in said first path opposing the permanent magnet flux through said faces, a portion of said shell in said second flux path including a magnetic restriction having a predetermined cross-sectional area correlated with its permeability to become substantially saturated when the resultant flux through said pole faces produced by said magnet and said coil is substantially zero.

References Cited in the file of this patent
UNITED STATES PATENTS

| | | |
|---|---|---|
| 2,130,870 | Boehne | Sept. 20, 1938 |
| 2,188,803 | Boehne | Jan. 30, 1940 |
| 2,275,839 | Boehne | Mar. 10, 1942 |
| 2,348,967 | Duby | May 16, 1944 |
| 2,387,613 | Ryba | Oct. 23, 1947 |
| 2,486,086 | Willing et al. | Oct. 25, 1949 |